United States Patent
Xu et al.

(10) Patent No.: US 11,009,366 B2
(45) Date of Patent: May 18, 2021

(54) NAVIGATION USING DYNAMIC INTERSECTION MAP DATA

(71) Applicant: HERE Global B.V., Eindhoven (NL)

(72) Inventors: Jingwei Xu, Buffalo Grove, IL (US); Bruce Bernhardt, Wauconda, IL (US); Yuxin Guan, Eindhoven (NL); Ivan Ivanovic, Berlin (DE)

(73) Assignee: HERE Global B.V., Eindhoven (NL)

( * ) Notice: Subject to any disclaimer, the term of this patent is extended or adjusted under 35 U.S.C. 154(b) by 131 days.

(21) Appl. No.: 16/194,771

(22) Filed: Nov. 19, 2018

(65) Prior Publication Data

US 2020/0158530 A1 May 21, 2020

(51) Int. Cl.
| | | |
|---|---|---|
| *G01C 21/36* | (2006.01) | |
| *G08G 1/0968* | (2006.01) | |
| *G08G 1/0967* | (2006.01) | |
| *G08G 1/096* | (2006.01) | |
| *G08G 1/095* | (2006.01) | |

(52) U.S. Cl.
CPC ......... *G01C 21/3658* (2013.01); *G08G 1/095* (2013.01); *G08G 1/096* (2013.01); *G08G 1/0967* (2013.01); *G08G 1/096822* (2013.01)

(58) Field of Classification Search
CPC ........ H02J 7/00036; H02J 7/0071; H02J 7/40; H02J 7/00; H02J 7/00034; H02J 7/00045; H02J 2207/30; H01M 10/4257; H01M 2010/4278; G01C 21/3658; G08G 1/095;
(Continued)

(56) References Cited

U.S. PATENT DOCUMENTS

| | | |
|---|---|---|
| 9,349,288 B2 | 5/2016 | Raamot |
| 9,435,654 B2 | 9/2016 | Ibrahim et al. |
| | (Continued) | |

FOREIGN PATENT DOCUMENTS

| | | |
|---|---|---|
| CN | 107945540 | 4/2018 |
| DE | 102013005362 | 10/2013 |
| EP | 3267418 A1 | 1/2018 |

OTHER PUBLICATIONS

European Patent Office, Extended European Search Report for Application No. 19209768.1, dated Apr. 23, 2020, 8 pages, Germany.

(Continued)

*Primary Examiner* — Anne Marie Antonucci
(74) *Attorney, Agent, or Firm* — Alston & Bird LLP

(57) ABSTRACT

Dynamic intersection map data is generated and provided. Traffic data is analyzed to identify an event. Responsive to identifying or receiving traffic data indicative of the event, it is determined whether the event affects one or more ingress or egress lanes of an intersection. Responsive to determining that the event affects at least one ingress or egress lane of an intersection, updated map data is generated for the intersection by updating map data corresponding to the at least one ingress or egress lane and, based on connection information corresponding to the at least one ingress or egress lane, further updating map data corresponding to one or more other lanes of the intersection. The updated map data is provided such that at least one vehicle apparatus receives the updated map data. The at least one vehicle apparatus uses the updated map data to perform one or more navigation functions.

20 Claims, 8 Drawing Sheets

(58) Field of Classification Search
CPC . G08G 1/096; G08G 1/0967; G08G 1/096822
See application file for complete search history.

(56) References Cited

U.S. PATENT DOCUMENTS

| | | | |
|---|---|---|---|
| 2014/0188376 A1* | 7/2014 | Gordon | G08G 1/09 |
| | | | 701/118 |
| 2014/0358414 A1 | 12/2014 | Ibrahim et al. | |
| 2016/0260325 A1 | 9/2016 | Modica et al. | |
| 2017/0301232 A1 | 10/2017 | Xu et al. | |
| 2018/0012486 A1* | 1/2018 | Israelsson | G01C 21/32 |
| 2018/0151064 A1 | 5/2018 | Xu et al. | |

OTHER PUBLICATIONS

Unknown., "Signal Phase and Time (SPAT) and Map Data (MAP)", Amsterdam Group, dated Apr. 2016, pp. 1-9.
"Reversible Traffic Lanes—How Will It Work," Wythe Creek Operations, [Retrieved From the Internet Oct. 4, 2019] <http://www.virginiadot.org/projects/resources/hampton_roads/Wythe_Creek/Wythe_Creek_Reversible_Lanes.pdf> (4 pages).

\* cited by examiner

```xml
<GenericLane>
    <laneID>302E</laneID>
    ...
    <connectsTo>
     <Connection>
      <signalGroup>1</signalGroup>
      <connectingLane>
       <lane>302A</lane>
      </connectingLane>
     </Connection>
    </connectsTo>
</GenericLane>
<GenericLane>
    <laneID>302F</laneID>
    ...
    <connectsTo>
     <Connection>
      <signalGroup>1</signalGroup>
      <connectingLane>
       <lane>302B</lane>
      </connectingLane>
     </Connection>
    </connectsTo>
</GenericLane>
```

```xml
<GenericLane>
     <laneID>302G</laneID>
     ...
     <connectsTo>
      <Connection>
       <signalGroup>1</signalGroup>
       <connectingLane>
        <lane>302C</lane>
       </connectingLane>
      </Connection>
     </connectsTo>
</GenericLane>
<GenericLane>
    <laneID>302D</laneID>
    <connectsTo>
     <Connection>
      <signalGroup>2<signalGroup>
      <connectingLane>
       <lane>302H</lane>
      </connectingLane>
     </Connection>
    </connectsTo>
</GenericLane>
```

FIG. 3C

NAVIGATION USING DYNAMIC INTERSECTION MAP DATA

TECHNOLOGICAL FIELD

An example embodiment relates generally to provision and use of dynamic map information/data for intersections. An example embodiment relates generally to updating signal phase and timing information/data for an intersection.

BACKGROUND

An intersection having a traffic signal (e.g., a traffic light) may be described by map information/data describing the topology of the intersection and signal phase and timing (SPaT) information/data describing current and future phases of the traffic signal and how those phases correspond to the topology of the intersection. Traditionally, map information/data is treated as static information/data while SPaT information/data is treated as dynamic information/data. However, for optimal operation of automated and/or advanced driver assistance systems (ADAS) it is desirable that (near) real-time accurate intersection information/data be available for use in performing various navigation functions.

BRIEF SUMMARY OF SOME EXAMPLE EMBODIMENTS

Various embodiments provide methods, systems, apparatuses, and computer program products for providing dynamic intersection information/data. In various embodiments intersection information/data comprises map information/data that describes the topology of the corresponding intersection. In an example embodiment, map information/data corresponding to an intersection identifies the ingress lanes of the intersection, identifies the egress lanes of the intersection, comprises connection information/data linking ingress and egress lanes of the intersection for allowed trajectories through the intersection, comprises maneuver information/data indicating allowed maneuvers through the intersection at each signal phase of the traffic signal corresponding to the intersection, describes the geometry of the ingress and egress lanes of the intersection, links signal phases to ingress and egress lanes, and/or the like. In various embodiments, the intersection information/data comprises SPaT information/data that describes the current and future signal phases of the traffic signal controlling the flow of traffic through the intersection. In an example embodiment, SPaT information/data indicates how the phases of the traffic signal correspond to the ingress and egress lanes of the intersection. In various embodiments, the term dynamic generally relates to information/data that may change on a time frame of minutes and/or seconds. In contrast, the term static generally relates to information/data that is expected to change on a time frame of days, weeks, months, quarters, years, or longer.

In various embodiments, traffic information/data indicative of an event is received. The traffic information/data is analyzed to identify events that affect one or more ingress and/or egress lanes of an intersection. Responsive to identifying an event that affects one or more ingress and/or egress lanes of an intersection, the map information/data corresponding to the intersection may be updated based on the effect of the event on the one or more ingress and/or egress lanes. In various embodiments, SPaT information/data corresponding to the intersection may also be updated.

The dynamic intersection information/data (e.g., the updated map and/or SPaT information/data) may be provided to one or more vehicle apparatuses for use in performing one or more navigation functions. For example, the dynamic intersection information/data may be used to perform navigation functions such as localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, and/or the like. In various embodiments, the intersection information/data provided to vehicle apparatuses is (near) real-time accurate.

In an example embodiment, a network apparatus receives traffic information/data indicative of an event. Responsive to identifying the event, the network apparatus determines whether the event affects one or more ingress or egress lanes of an intersection. Responsive to determining that the event affects at least one ingress or egress lane of an intersection, the network apparatus generates updated map information/data for the intersection by updating map information/data corresponding to the at least one ingress or egress lane and, based on connection information/data corresponding to the at least one ingress or egress lane, updating map information/data corresponding to one or more other lanes of the intersection. The network apparatus provides the updated map information/data such that at least one vehicle apparatus receives the updated map data. The at least one vehicle apparatus uses the updated map to perform one or more navigation functions.

In accordance with an aspect of the present invention, a method for generating and providing dynamic intersection information/data for use by a vehicle apparatus is provided. In an example embodiment, the method comprises, receiving, by a network apparatus, traffic information/data indicative of an event. The method further comprises, responsive to identifying the event, determining, by the network apparatus, whether the event affects one or more ingress or egress lanes of an intersection. The method further comprises, responsive to determining that the event affects at least one ingress or egress lane of an intersection, generating, by the network apparatus, updated map information/data for the intersection by updating map information/data corresponding to the at least one ingress or egress lane and, based on connection information/data corresponding to the at least one ingress or egress lane, updating map information/data corresponding to one or more other lanes of the intersection. The method further comprises providing, by the network apparatus, the updated map information/data such that at least one vehicle apparatus receives the updated map data. The at least one vehicle apparatus uses the updated map to perform one or more navigation functions.

In an example embodiment, the map data comprises connection information/data linking the at least one ingress or egress lane of the intersection to one or more egress or ingress lanes of the intersection. In an example embodiment, the map information/data comprises maneuver information/data indicating how a vehicle may move through the intersection on a trajectory that comprises the at least one ingress or egress lane and a signal phase of a traffic signal at the intersection corresponding to the trajectory. In an example embodiment, the method further comprises receiving signal phase and timing (SPaT) information/data for a traffic signal located at the intersection; and providing the SPaT information/data to the vehicle apparatus along with the updated map information/data, the SPaT information/data being configured for use by the vehicle apparatus in performing one or more navigation functions. In an example embodiment, the method further comprises determining modified signal phase and timing (SPaT) information/data for a traffic signal located at the intersection based on the updated map information/data; and providing the modified SPaT information/data such that a traffic signal apparatus receives the modified SPaT data, wherein the traffic signal apparatus is configured to operate a traffic signal located at the intersection in accordance with the modified SPaT information/data. In an example embodiment, the method further comprises providing the modified SPaT information/data to the vehicle apparatus. In an example embodiment, the event affects an ingress or egress lane of the intersection if the event causes a change in a flow of traffic along the ingress or egress lane. In an example embodiment, the event affects an ingress or egress lane of the intersection if the event prevents a flow of traffic along the ingress or egress lane.

According to another aspect of the present invention, an apparatus is provided. In an example embodiment, the apparatus comprises at least one processor, at least one non-transitory memory storing computer program code, and at least one communications interface configured to communicate via at least one network. The computer program code is configured to, when executed by the at least one processor, cause the apparatus to at least receive traffic information/data indicative of an event; responsive to identifying the event, determine whether the event affects one or more ingress or egress lanes of an intersection; responsive to determining that the event affects at least one ingress or egress lane of an intersection, generate updated map information/data for the intersection by updating first map information/data corresponding to the at least one ingress or egress lane and, based on connection information/data corresponding to the at least one ingress or egress lane, updating second map information/data corresponding to one or more other lanes of the intersection; and provide the updated map information/data such that at least one vehicle apparatus receives the updated map data. The at least one vehicle apparatus uses the updated map to perform one or more navigation functions.

In an example embodiment, the map data comprises connection information/data linking the at least one ingress or egress lane of the intersection to one or more egress or ingress lanes of the intersection. In an example embodiment, the map information/data comprises maneuver information/data indicating how a vehicle may move through the intersection on a trajectory that comprises the at least one ingress or egress lane and a signal phase of a traffic signal at the intersection corresponding to the trajectory. In an example embodiment, the computer program code is further configured to, when executed by the at least one processor, cause the apparatus to at least receive signal phase and timing (SPaT) information/data for a traffic signal located at the intersection; and provide the SPaT data to the vehicle apparatus along with the updated map information/data, the SPaT information/data being configured for use by the vehicle apparatus in performing one or more navigation functions. In an example embodiment, the computer program code is further configured to, when executed by the at least one processor, cause the apparatus to at least determine modified signal phase and timing (SPaT) information/data for a traffic signal located at the intersection based on the updated map information/data; and provide the modified SPaT information/data such that a traffic signal apparatus receives the modified SPaT data, wherein the traffic signal apparatus is configured to operate a traffic signal located at the intersection in accordance with the modified SPaT information/data. In an example embodiment, the computer program code is further configured to, when executed by the at least one processor, cause the apparatus to at least provide the modified SPaT information/data to the vehicle apparatus. In an example embodiment, the event affects an ingress or egress lane of the intersection if the event causes a change in a flow of traffic along the ingress or egress lane. In an example embodiment, the event affects an ingress or egress lane of the intersection if the event prevents a flow of traffic along the ingress or egress lane.

In accordance with still another aspect of the present invention, a computer program product is provided. The computer program product comprises at least one non-transitory computer-readable storage medium having computer-executable program code instructions stored therein. The computer-executable program code instructions comprise program code instructions configured to, when executed by a processor of an apparatus, cause the apparatus to at least receive traffic information/data indicative of an event; responsive to identifying the event, determine whether the event affects one or more ingress or egress lanes of an intersection; responsive to determining that the event affects at least one ingress or egress lane of an intersection, generate updated map information/data for the intersection by updating map information/data corresponding to the at least one ingress or egress lane and, based on connection information/data corresponding to the at least one ingress or egress lane, updating map information/data corresponding to one or more other lanes of the intersection; and provide the updated map information/data such that at least one vehicle apparatus receives the updated map data. The at least one vehicle apparatus uses the updated map to perform one or more navigation functions.

In an example embodiment, the map data comprises connection information/data linking the at least one ingress or egress lane of the intersection to one or more egress or ingress lanes of the intersection. In an example embodiment, the map information/data comprises maneuver information/data indicating how a vehicle may move through the intersection on a trajectory that comprises the at least one ingress or egress lane and a signal phase of a traffic signal at the intersection corresponding to the trajectory. In an example embodiment, the computer-executable program code instructions further comprise program code instructions configured to, when executed by a processor of an apparatus, cause the apparatus to at least receive signal phase and timing (SPaT) information/data for a traffic signal located at the intersection; and provide the SPaT data to the vehicle apparatus along with the updated map information/data, the SPaT information/data being configured for use by the vehicle apparatus in performing one or more navigation functions. In an example embodiment, the computer-executable program code instructions further comprise program code instructions configured to, when executed by a processor of an apparatus, cause the apparatus to at least determine modified signal phase and timing (SPaT) information/data for a traffic signal located at the intersection based on the updated map information/data; and provide the modified SPaT information/data such that a traffic signal apparatus receives the modified SPaT data, wherein the traffic signal apparatus is configured to operate a traffic signal located at the intersection in accordance with the modified SPaT information/data. In an example embodiment, the computer-executable program code instructions further comprise program code instructions configured to, when executed by a processor of an apparatus, cause the apparatus to at least provide the modified SPaT information/data to the vehicle apparatus. In an example embodiment, the event affects an ingress or egress lane of the intersection if the event causes a change in a flow of traffic along the ingress or egress lane. In an example embodiment, the event affects an ingress or egress lane of the intersection if the event prevents a flow of traffic along the ingress or egress lane.

In still another aspect of the present invention, an apparatus is provided. In an example embodiment, the apparatus comprises means for receiving traffic information/data indicative of an event. The apparatus comprises means for, responsive to identifying the event, determining whether the event affects one or more ingress or egress lanes of an intersection. The apparatus comprises means for, responsive to determining that the event affects at least one ingress or egress lane of an intersection, generating updated map information/data for the intersection by updating first map information/data corresponding to the at least one ingress or egress lane and, based on connection information/data corresponding to the at least one ingress or egress lane, updating second map information/data corresponding to one or more other lanes of the intersection. The apparatus comprises means for providing the updated map information/data such that at least one vehicle apparatus receives the updated map data. The at least one vehicle apparatus uses the updated map to perform one or more navigation functions.

BRIEF DESCRIPTION OF THE DRAWINGS

Figure 1:
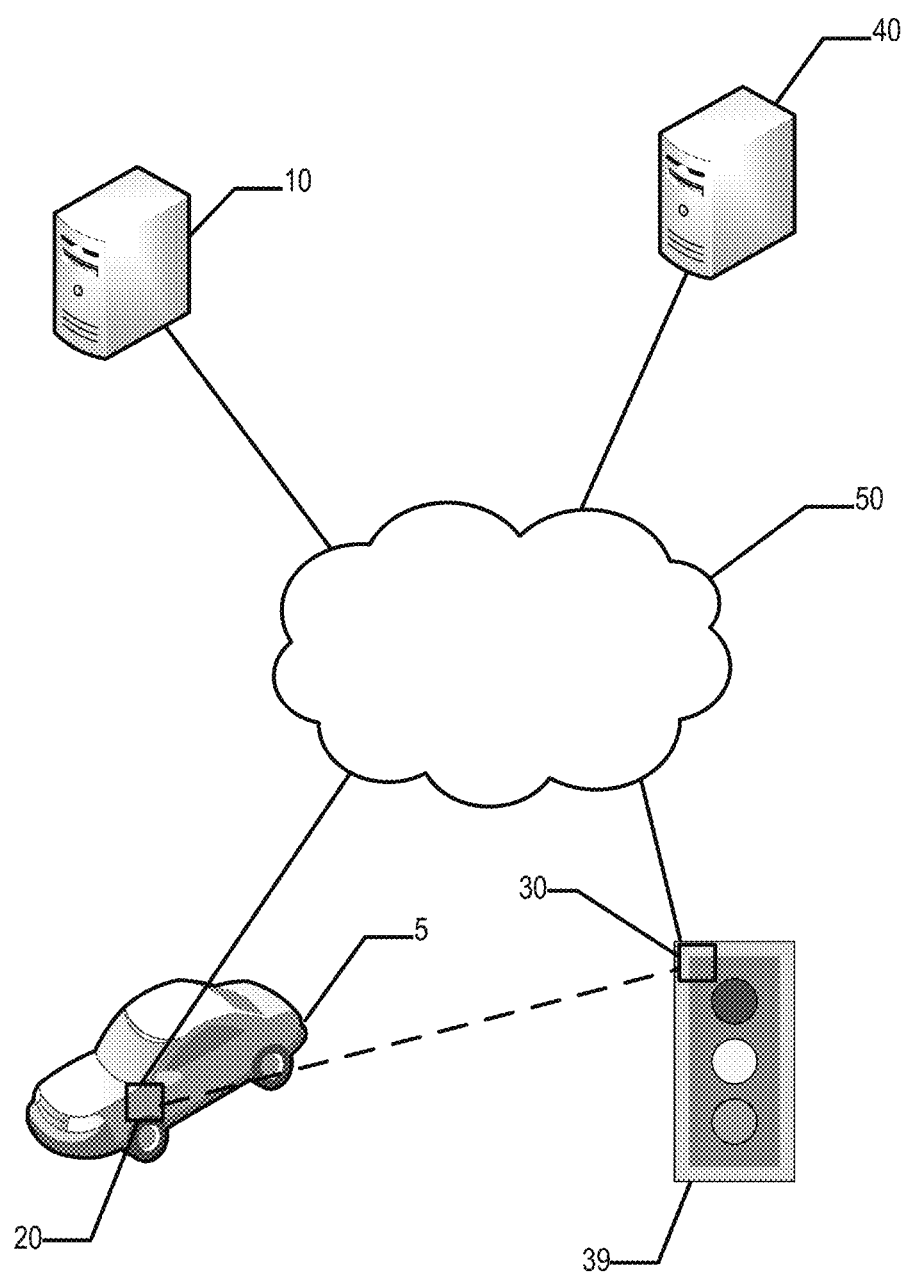
Figure 2A:
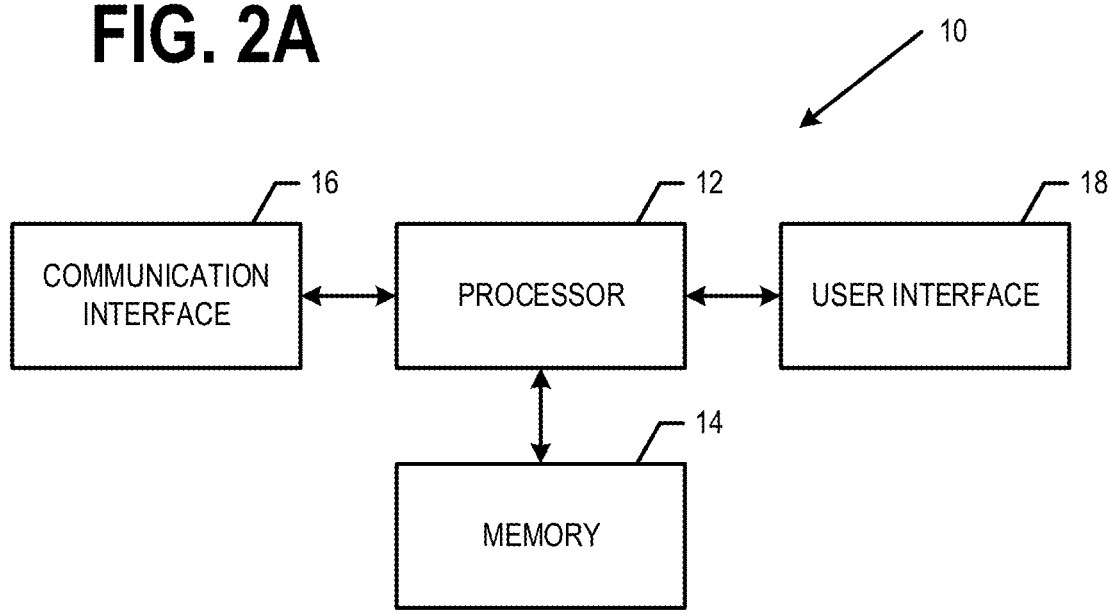
Figure 2B:
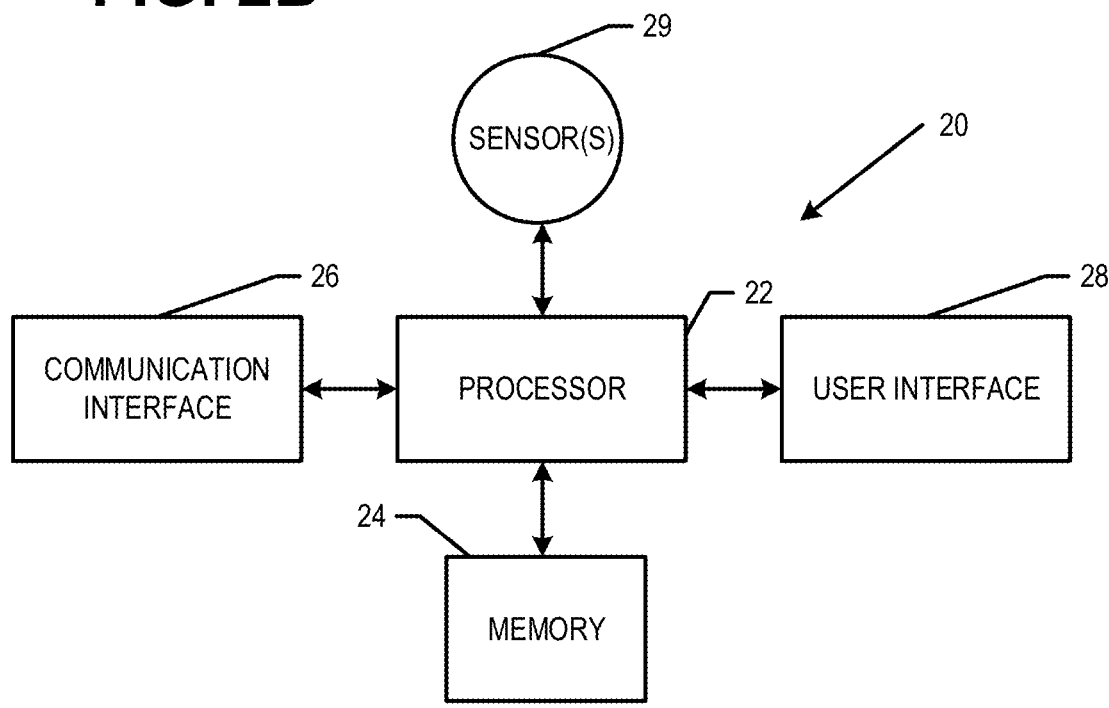
Figure 2C:
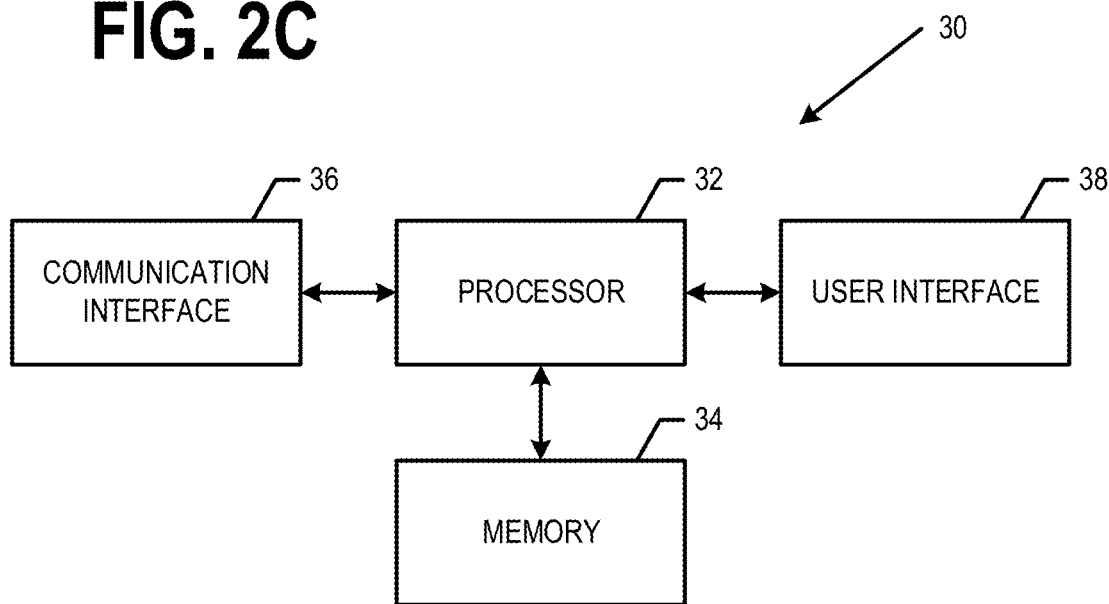
Figure 3A:
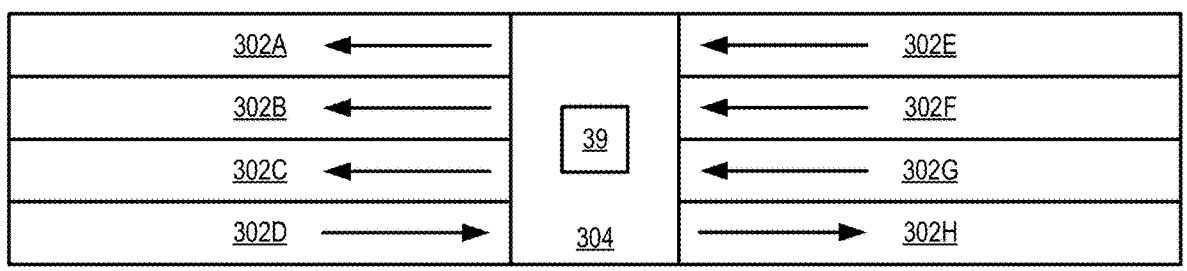
Figure 3B:
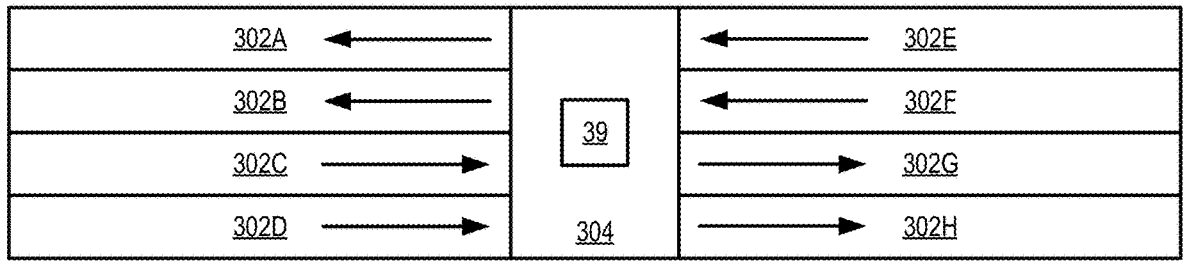
Figure 4:
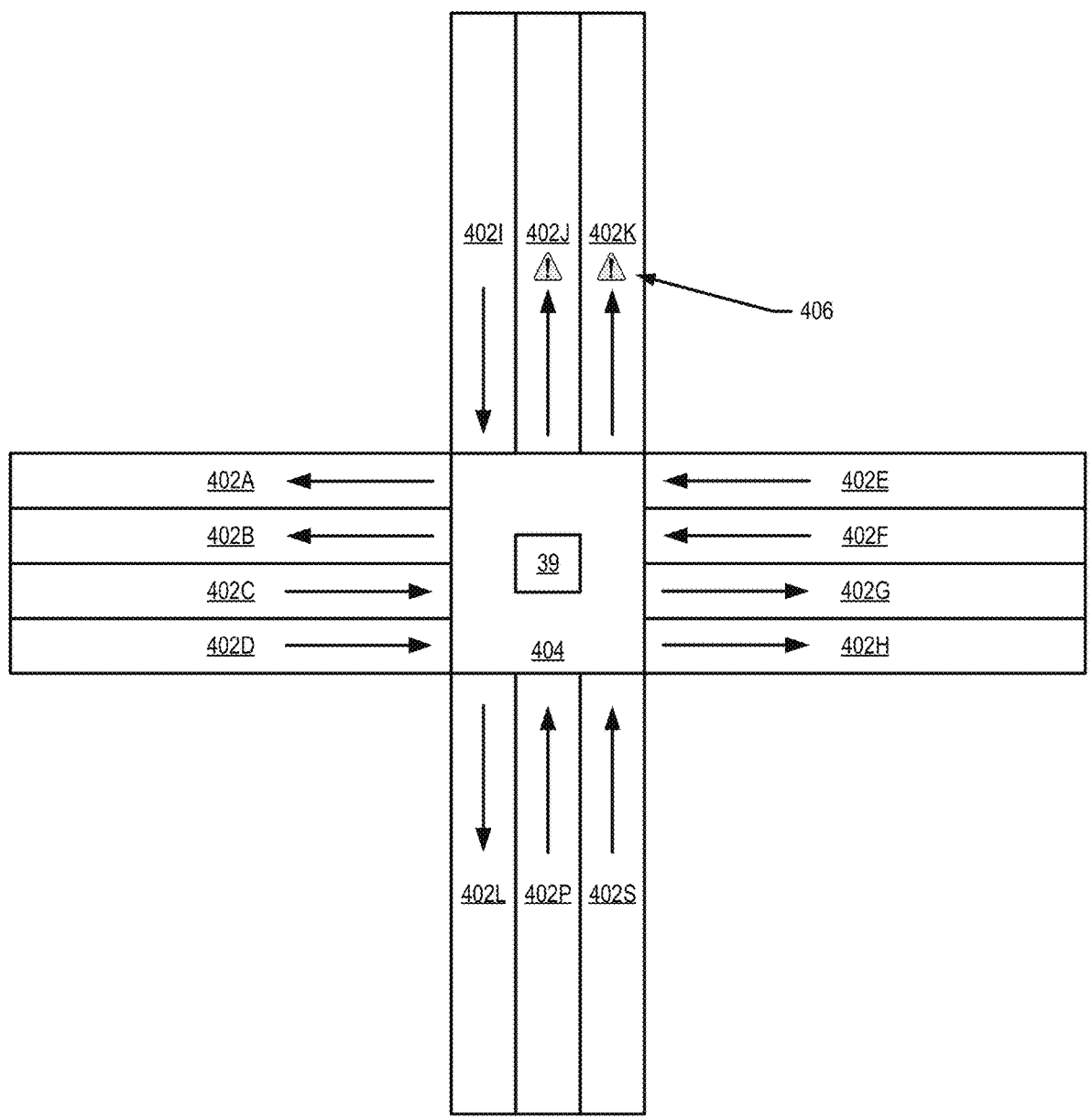
Figure 5:
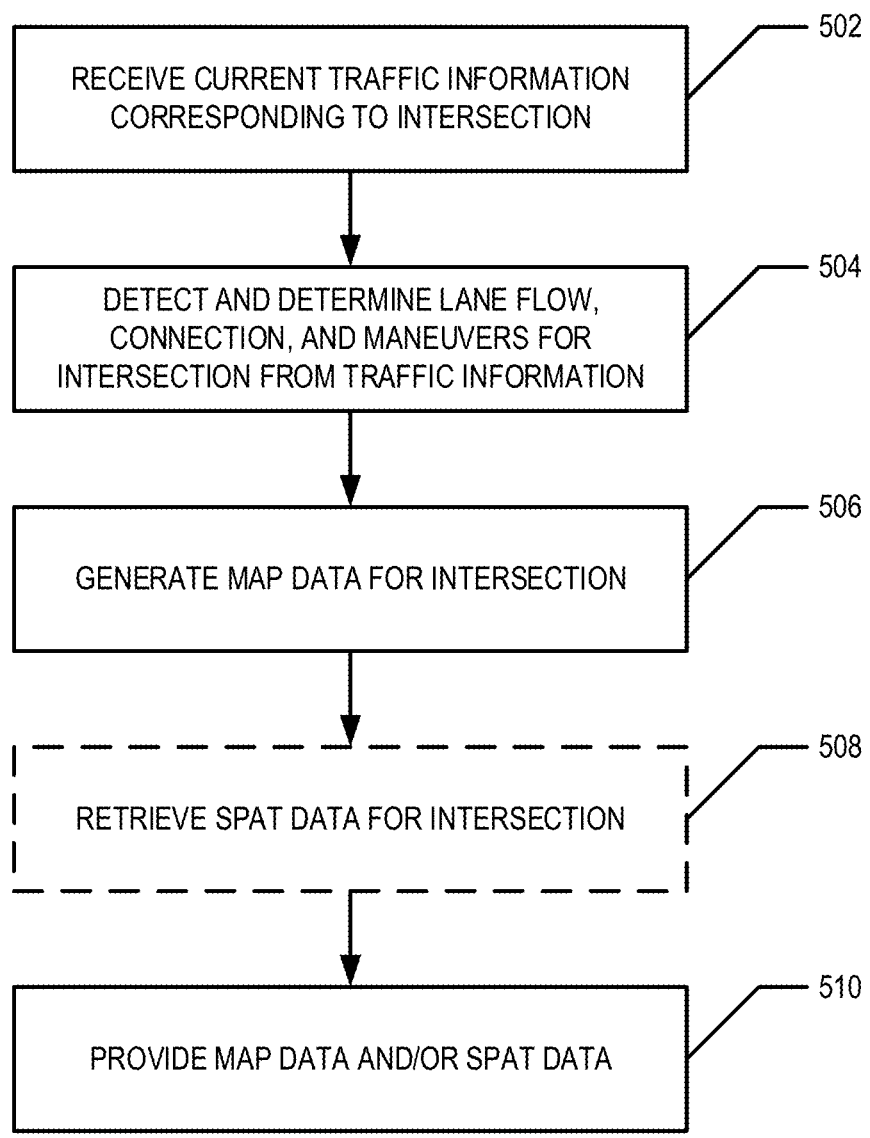
Figure 6:
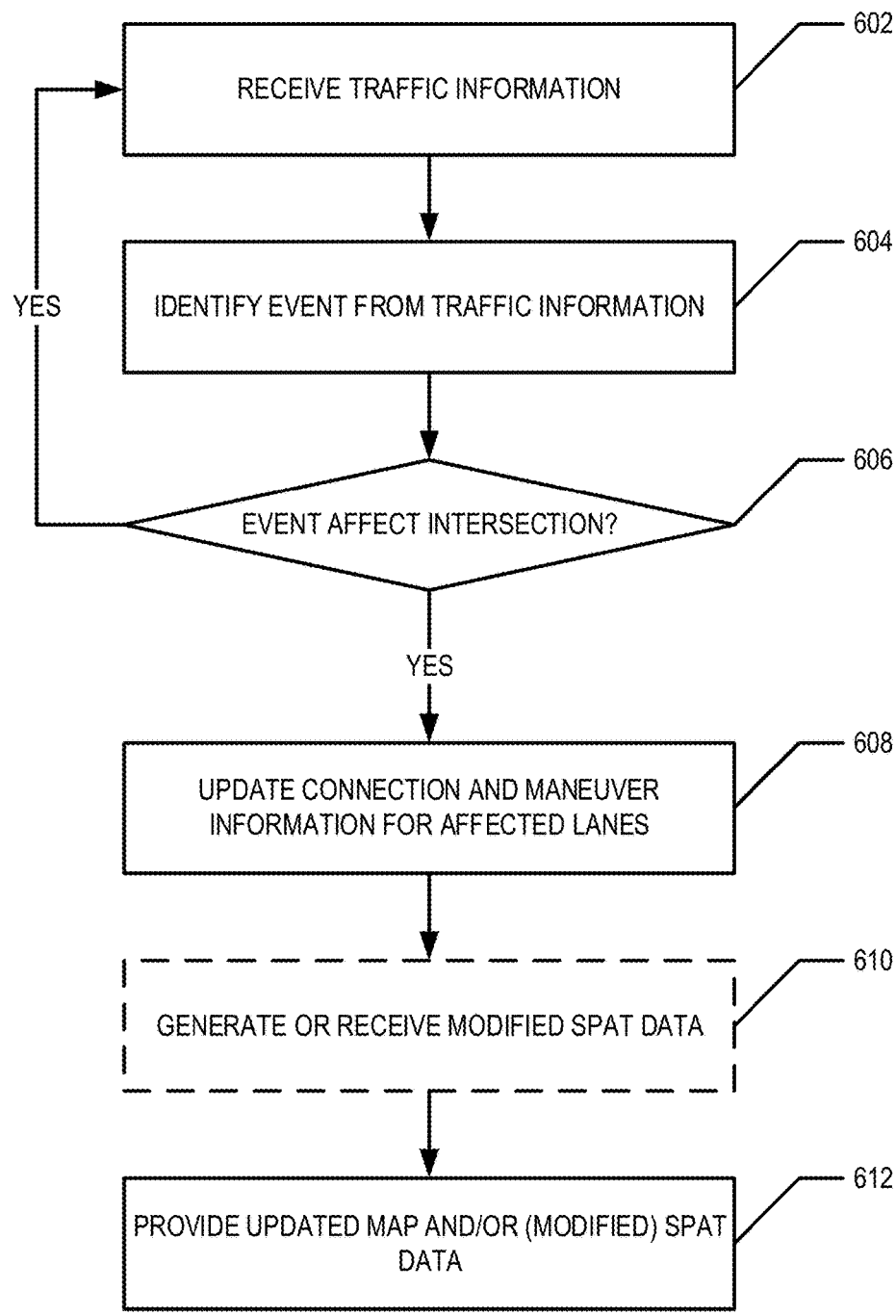

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a network apparatus that may be specifically configured in accordance with an example embodiment;

FIG. 2B is a block diagram of a vehicle apparatus that may be specifically configured in accordance with an example embodiment;

FIG. 2C is a block diagram of a traffic signal apparatus that may be specifically configured in accordance with an example embodiment;

FIGS. 3A and 3B are schematic diagrams illustrating two different topologies of the same example intersection;

FIG. 3C is an example portion of an instance map information/data corresponding to the example intersection shown in FIG. 3A;

FIG. 4 is a schematic diagram of another example intersection;

FIG. 5 is a flowchart illustrating operations performed, such as by the network apparatus of FIG. 2A, to generate and provide dynamic intersection information/data, according to an example embodiment; and FIG. 6 is a flowchart illustrating operations performed, such as by the network apparatus of FIG. 2A, to generate and provide dynamic intersection information/data, according to an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. Additionally, as used herein, the term 'circuitry' may include (d) the components to receive and transmit information to/from a network, the traffic signal controller itself, from a nearby by communications device or another vehicle(s). This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, systems, and computer program products are provided for providing dynamic intersection information/data. For example, the dynamic intersection information/data may comprise map information/data that is (near) real-time accurate. In various embodiments, a vehicle apparatus onboard and/or coupled to a vehicle may use the dynamic intersection information/data to perform one or more navigation functions. In an example embodiment, SPaT information/data corresponding to a traffic signal controlling the flow of traffic through an intersection may be modified, for example, by the network apparatus.

In various embodiments, a network apparatus receives traffic information/data and analyzes the traffic information/data to identify events that affect one or more ingress and/or egress lanes of an intersection. The map information/data corresponding to the intersection is then updated based on the effect of the identified event. For example, map information/data describing lane connection, allowed maneuvers, lane attributes, and/or the like may be updated. The updated map information/data is then provided to one or more vehicle apparatuses. In an example embodiment, updated SPaT information may be received and provided to one or more vehicle apparatuses alongside the updated map information/data.

FIG. 1 provides an illustration of an example system that can be used in conjunction with various embodiments of the present invention. As shown in FIG. 1, the system may include one or more network apparatuses 10, one or more vehicle apparatuses 20, wherein each vehicle apparatus 20 is disposed on a vehicle 5, one or more traffic signal apparatuses 30, one or more traffic management apparatuses 40, one or more networks 50, and/or the like.

In various embodiments, the vehicle apparatus 20, may be an in vehicle navigation system, vehicle control system, a mobile computing device, a mobile data gathering platform, and/or the like. For example, a vehicle apparatus 20 may be an in vehicle navigation system mounted within, coupled to, and/or onboard a vehicle 5 such as a motor vehicle, non-motor vehicle, automobile, car, scooter, truck, van, bus, motorcycle, bicycle, Segway, golf cart, and/or the like. In various embodiments, the vehicle 5 is an autonomous, self-driving vehicle. In an example embodiment, the vehicle apparatus 20 may be a vehicle control system configured to autonomously drive a vehicle 5, assist in control of a vehicle 5 (e.g., an advanced driver-assistance system (ADAS)), monitor various aspects of the vehicle 5 (e.g., fault conditions, motor oil status, battery charge level, fuel tank fill level, and/or the like) and/or the like. In various embodiments, the vehicle apparatus 20 is configured to autonomously drive a vehicle 5 and may perform multiple functions that are similar to those performed by a vehicle apparatus 20 configured to be an ADAS (e.g., lane keeping, lane change assistance, maintaining a lane, merging, etc.). In some embodiments, vehicle apparatus 20 may be onboard a personal vehicle, commercial vehicle, public transportation vehicle, fleet vehicle, and/or other vehicle. In an example embodiment, a vehicle apparatus 20 is onboard a vehicle 5 and is used to perform one or more navigation functions corresponding to the vehicle 5 traversing at least a portion of a road network. Some non-limiting examples of navigation functions are localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, and/or the like.

In an example embodiment, the network apparatus 10 may be a server, group of servers, distributed computing system, and/or other computing system. For example, the network apparatus 10 may be in communication with one or more vehicle apparatuses 20, one or more traffic signal apparatuses 30, one or more traffic management apparatuses 40, and/or the like via one or more wired and/or wireless networks 50. In an example embodiment, the network apparatus 10 is remotely located with respect to the vehicle apparatus 20 as the network apparatus 10 is not onboard and/coupled to the vehicle 5.

In an example embodiment, the traffic signal apparatus 30 is coupled to a traffic signal 39 such that the traffic signal apparatus 30 controls the operation of the traffic signal 39. For example, the traffic signal apparatus 30 may cause the traffic signal 39 to operate in accordance with SPaT information/data programmed into, determined by, and/or the like the traffic signal apparatus 30.

In an example embodiment, a network apparatus 10 may comprise components similar to those shown in the example network apparatus 10 diagrammed in FIG. 2A. In various embodiments, the network apparatus 10 is configured to receive traffic information/data (e.g., via one or more networks 50), analyze the traffic information/data to identify events that affect an intersection, update intersection information/data for an intersection affected by an event, and provide the updated intersection information/data (e.g., via one or more networks 50). In an example embodiment, the network apparatus 10 may be configured to determine modified SPaT information/data for an affected intersection. For example, as shown in FIG. 2A, the network apparatus 10 may comprise a processor 12, memory 14, a user interface 18, a communications interface 16, and/or other components configured to perform various operations, procedures, functions or the like described herein. In at least some example embodiments, the memory 14 is non-transitory.

In various embodiments, a vehicle apparatus 20 is configured to receive intersection information/data (e.g., updated intersection information/data), use intersection information/data to perform one or more navigation functions, and/or the like. In an example embodiment, as shown in FIG. 2B, the vehicle apparatus 20 may comprise a processor 22, memory 24, a communications interface 26, a user interface 28, and one or more sensors 29. In an example embodiment, the one or more sensors 29 may comprise one or more of one or more location sensors such one or more of a GNSS sensor; IMU sensors; an odometry system, and/or the like; and/or other components configured to perform various operations, procedures, functions or the like described herein. For example, in an example embodiment, a vehicle apparatus 20 may comprise and/or be in communication with one or more sensors 29 comprising one or more of, for example, a camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 20 to determine one or more features of the corresponding vehicle's 5 surroundings and/or monitor the vehicle's 5 operating parameters). In at least some example embodiments, the memory 24 is non-transitory.

In various embodiments, a traffic signal apparatus 30 may be a computing entity, computing device, controller, and/or the like. In various embodiments, the traffic signal apparatus 30 may control a traffic signal 39 located at an intersection and/or other location along a road network. In various embodiment, the traffic signal 39 may control the flow of traffic through an intersection of the road network in accordance with SPaT information/data programmed into, received by, determined by, and/or the like the traffic signal apparatus 30. For example, the traffic signal apparatus 30 may cause the phase of the traffic signal 39 to change in accordance with SPaT information/data. In an example embodiment, a traffic signal apparatus 30 may be configured to communicate SPaT information/data to a traffic management system 40, to one or more vehicle apparatuses 20 within the vicinity of the traffic signal 39 (e.g., via a dedicated short-range communications (DSRC) message), and/or the like. For example, as shown in FIG. 2C, the traffic signal apparatus 30 may comprise a processor 32, memory 34, a communications interface 36, and/or other components configured to perform various operations, procedures, functions or the like described herein. In an example embodiment, the traffic signal apparatus 30 comprises and/or is coupled to a user interface 38 (e.g., one or more colored lights of the traffic signal 39). In at least some example embodiments, the memory 34 is non-transitory.

In various embodiments, a traffic management apparatus 40 may be configured to receive and/or generate traffic information/data, provide traffic information/data, receive and/or provide SPaT information/data, and/or the like. In various embodiments, a traffic management apparatus 40 may comprise a processor, memory, user interface, communications interface, and/or other components configured to perform various operations, procedures, functions or the like described herein.

In an example embodiment, a network apparatus 10 may be in communication with one or more apparatuses 20, traffic signal apparatuses 30, and/or traffic management apparatuses 40 via one or more wired and/or wireless networks 50. For example, each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network (e.g., 5G, 4G, LTE, 3G, and/or the like), short and/or medium range communications, fiber to wireless, Wi-Fi, radio data system (RDS) messages over the air radio interface, transport protocol experts group (TPEG) service by connected HyperText Transfer Protocol (HTTP) or User Datagram Protocol (UDP), and/or the like and/or combinations thereof. In some embodiments, a network 50 may comprise the automotive cloud, digital transportation infrastructure (DTI), radio data system (RDS)/high definition (HD) radio or other digital radio system, and/or the like. For example, a vehicle apparatus 20 may be in communication with a network apparatus 10 via the network 50. For example, a network apparatus 10 may communicate with a vehicle apparatus 20 via a network, such as the Cloud. For example, the Cloud may be a computer network that provides shared computer processing resources and data to computers and other devices connected thereto. In another example, a traffic signal apparatus 30 may communicate with a vehicle apparatus 20 via a short and/or mid range communication protocol. For example, the traffic signal apparatus 30 may communicate with a vehicle apparatus via a DSRC message as defined by SAE J2735.

Certain example embodiments of the network apparatus 10, vehicle apparatus 20, and/or traffic signal apparatus 30 are described in more detail below with respect to FIGS. 2A, 2B, and 2C.

II. Example Operation

Example embodiments provide methods, apparatus, systems, computer program products, and/or the like for generating and providing dynamic intersection information/data. In an example embodiment, the dynamic intersection information/data is generated and/or provided to be (near) real-time accurate. In an example embodiment, dynamic intersection information/data comprises dynamic map information/data describing the topology of the intersection and the ingress and/or egress lanes of the intersection and dynamic SPaT information/data that describes the current and/or future phases of a traffic signal 39 configured to control the flow of traffic through the intersection.

In various embodiments intersection information/data comprises map information/data that describes the topology of the corresponding intersection. In an example embodiment, map information/data corresponding to an intersection identifies the ingress lanes of the intersection, identifies the egress lanes of the intersection, comprises connection information/data linking ingress and egress lanes of the intersection for allowed trajectories through the intersection, comprises maneuver information/data indicating allowed maneuvers through the intersection at each signal phase of the traffic signal corresponding to the intersection, describes the geometry of the ingress and egress lanes of the intersection, links signal phases to ingress and egress lanes, and/or the like. In various embodiments, the intersection information/data comprises SPaT information/data that describes the current and future signal phases of the traffic signal controlling the flow of traffic through the intersection. In an example embodiment, SPaT information/data indicates how the phases of the traffic signal correspond to the ingress and egress lanes of the intersection. In various embodiments, the term dynamic generally relates to information/data that may change on a time frame of minutes and/or seconds. In contrast, the term static generally relates to information/data that is expected to change on a time frame of days, weeks, months, quarters, years, or longer.

In various embodiments, traffic information/data is analyzed to identify events that affect one or more ingress and/or egress lanes of an intersection. Responsive to identifying an event that affects one or more ingress and/or egress lanes of an intersection, the map information/data corresponding to the intersection may be updated based on the effect of the event on the one or more ingress and/or egress lanes. In various embodiments, SPaT information/data corresponding to the intersection may also be updated. The dynamic intersection information/data (e.g., the updated map and/or SPaT information/data) may be provided to one or more vehicle apparatuses for use in performing one or more navigation functions. For example, the dynamic intersection information/data may be used for localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, and/or the like. In various embodiments, the intersection information/data provided to vehicle apparatuses is (near) real-time accurate.

In various embodiments, events that affect one or more ingress and/or egress lanes of an intersection are identified. In various embodiments, an event may affect one or more ingress and/or egress lanes of an intersection if the event is located in and/or at one or more ingress and/or egress lanes of an intersection and/or corresponds to one or more ingress and/or egress lanes of an intersection. In an example embodiment, the event may affect one or more ingress and/or egress lanes of an intersection if the event prevents a normal flow of traffic in the corresponding ingress and/or egress lanes. For example, the event may affect the one or more ingress and/or egress lanes of the intersection if the event prevents vehicles from traversing and/or traveling along the one or more ingress and/or egress lanes of the intersection. In various embodiments, the event may be an accident or incident (e.g., blocking and/or partially blocking one or more ingress and/or egress lanes of an intersection), construction, a planned road/lane closure (e.g., for a festival, parade, road race, or the like), switching of a reversible lane, an evacuation route being activated, and/or the like.

In various embodiments, events that affect one or more ingress and/or egress lanes of an intersection are identified by a network apparatus 10 through the analysis of traffic information/data. In an example embodiment, traffic information/data comprises one or more of raw probe information/data (e.g., probe trajectories), map-matched and/or lane-matched vehicle trajectories, lane level traffic information/data and/or road segment level traffic information/data corresponding to traffic flow, information/data received from but not limited to a traffic management entity and/or department of transportation (e.g., regarding scheduled road/lane closures, construction, first responder incident information/ data, expected at-grade train crossings and/or activation of an at-grade train crossing alert/gate, and/or the like), historical traffic information/data, and/or the like. In an example embodiment, the information received from a traffic management entity and/or department of transportation is provided via a traffic management apparatus 40.

Responsive to determining that an event is affecting one or more ingress and/or egress lanes, the map information/ data corresponding to the intersection is updated. For example, the lane connection information, maneuver information/data, and/or other map information/data may be updated to indicate the effect(s) of the identified event.

For example, FIG. 3A illustrates an example intersection 304 at time T1 when lanes 302A, 302B, 302C, 302E, 302F, and 302G are traveling right to left and lanes 302D and 302H are traveling left to right. The connection information/ data of the map information/data corresponding to intersection 304 indicates that lane 302E is connected to lane 302A, lane 302F is connected to lane 302B, lane 302G is connected to lane 302C, and lane 302D is connected to lane 302H. The maneuver information/data of the map information/data corresponding to intersection 304 may indicate that during phase one of the traffic signal 39, a vehicle may travel from lane 302E to lane 302A, from lane 302F to lane 302B, from lane 302G to lane 302C, and/or from lane 302D to lane 302H. During phase two of the traffic signal 39, no maneuvers are available (e.g., the traffic signal 39 may be a pedestrian walk signal). The map information/data corresponding to intersection 304 may further comprise geometry information/data describing the geometry of ingress lanes 302E, 302F, 302G, 302D and egress lanes 302A, 302B, 302C, 302H. FIG. 3C provides an example portion of an instance of map information/data corresponding to intersection 304 at time T1. In particular, the illustrated example portion of the instance of map information/data indicates that lane 302E is connected to lane 302A such that during phase one of the traffic signal 39, a vehicle may traverse the intersection from lane 302E to lane 302A. For example, the maneuver of traversing the intersection from lane 302E to lane 302A is available and/or allowed maneuver during phase one of the traffic signal.

FIG. 3B illustrates the example intersection 304 at time T2 when lanes 302A, 302B, 302E, and 302F are traveling right to left and lanes 302C, 302D, 302G, and 302H are traveling left to right. For example, lanes 302C and 302G may be reversible lanes. The reversing of the direction of travel along lanes 302C and 302G may be identified as an event that affects one or more ingress and/or egress lanes of the intersection 304. For example, in an example embodiment, the connection information/data corresponding to intersection 304 may be updated to indicate that lane 302E is connected to lane 302A, lane 302F is connected to lane 302B, lane 302C is connected to lane 302G, and lane 302D is connected to lane 302H. The maneuver information/data corresponding to intersection 304 may be updated to indicate that during phase one of the traffic signal 39, a vehicle may travel from lane 302E to lane 302A, from lane 302F to lane 302B, from lane 302C to lane 302G, and/or from lane 302D to lane 302H. The maneuver information/data corresponding to phase two of the traffic signal 39 may not be updated as nothing has changed regarding the maneuvers available to a vehicle during phase two of the traffic signal 39. In an example embodiment, the geometry information/ data describing the geometry of lanes 302C and 302G may be updated. For example, the geometry information/data describing an ingress lane may include the location of a stop line for the lane. Thus, as lane 302C has switched from an egress lane to an ingress lane of intersection 304, the geometry information/data corresponding lane 302C may be updated to add the location of the stop line for lane 302C. In an example embodiment, the geometry information/data corresponding to lane 302G may be updated to remove the location of the stop line as the stop line is not relevant to an egress lane.

FIG. 4 illustrates another example intersection 404. The map information/data corresponding to intersection 404 identifies ingress lanes 402C, 402D, 402E, 402F, 402I, 402P, and 402S and egress lanes 402A, 402B, 402G, 402H, 402J, 402K, and 402L corresponding to the intersection 404. The map information/data corresponding to intersection 404 further comprises maneuver information/data for the intersection 404. The maneuver information/data corresponding to intersection 404, when an event is not affecting the intersection 404 (e.g., none of the ingress or egress lanes of intersection 404 are affected by an event) for the various signal phases of the traffic signal 39 are summarized in Table 1. For example, when an event is not affecting the intersection 404, during signal phase 1 of the traffic signal 39, the maneuver information/data corresponding to intersection 404 may indicate that the available and/or allowed maneuvers through the intersection consist of traveling from ingress lane 402C to egress lane 402J, from ingress lane 402C to egress lane 402G, from ingress lane 402D to egress lane 402H, and from ingress lane 402D to egress lane 402L.

TABLE 1

Available/allowed maneuvers for each signal phase when an event is not affecting intersection 404

| Signal Phase | Ingress Lane | Egress Lane |
|---|---|---|
| 1 | 402C | 402J |
| 1 | 402C | 402G |
| 1 | 402D | 402H |
| 1 | 402D | 402L |
| 2 | 402C | 402G |
| 2 | 402D | 402H |
| 2 | 402D | 402L |
| 2 | 402F | 402B |
| 2 | 402E | 402A |
| 2 | 402E | 402K |
| 3 | 402F | 402L |
| 3 | 402F | 402B |
| 3 | 402E | 402A |
| 3 | 402E | 402K |
| 4 | 402I | 402A |
| 4 | 402I | 402L |
| 4 | 402I | 402G |
| 5 | 402P | 402B |
| 5 | 402P | 402J |
| 5 | 402S | 402K |
| 5 | 402S | 402H |

However, in an instance in which an event 406 (e.g., a vehicle accident) blocks the traffic flow of egress lanes 402J and 402K, the maneuver information/data may be updated to reflect that lanes 402J and 402K are not available as egress lanes. For example, Table 2 summarizes the available and/or allowed maneuvers through intersection 404 for the various signal phases of the traffic signal 39 when an event is affecting egress lanes 402J and 402K.

TABLE 2

Available/allowed maneuvers for each signal phase when an event 406 is affecting egress lanes 402J and 402K of intersection 404

| Signal Phase | Ingress Lane | Egress Lane |
| --- | --- | --- |
| 1 | 402C | 402G |
| 1 | 402D | 402H |
| 1 | 402D | 402L |
| 2 | 402C | 402G |
| 2 | 402D | 402H |
| 2 | 402D | 402L |
| 2 | 402F | 402B |
| 2 | 402E | 402A |
| 3 | 402F | 402L |
| 3 | 402F | 402B |
| 3 | 402E | 402A |
| 4 | 402I | 402A |
| 4 | 402I | 402L |
| 4 | 402I | 402G |
| 5 | 402P | 402B |
| 5 | 402S | 402H |

As can be seen from Table 2, the available and/or allowed maneuvers of signal phase 1 are now a subset of the available and/or allowed maneuvers of signal phase 2. In such an instance, the SPaT information/data of the traffic signal 39 may be updated such that the traffic signal 39 does not enter signal phase 1 until the event affecting lanes 402J and 402K has been resolved (e.g., lanes 402J and 402K are no longer affected by an event). For example, in an example embodiment, a traffic management apparatus 40 and/or the network apparatus 10 may communicate with the traffic signal apparatus 30 (e.g., via network 50) to provide modified SPaT information/data to the traffic signal apparatus 30. The traffic signal apparatus 30 may then use the modified SPaT information/data to control the traffic signal 39. The modified SPaT information/data may be configured to cause efficient traffic flow through the intersection 404 during the time that the intersection is affected by the event.

In various embodiments, responsive to identifying that an event is affecting an intersection (e.g., the event is affecting one or more ingress and/or egress lanes of an intersection), the network apparatus 10 may update the map information/data to reflect the currently available and/or allowed maneuvers, and/or the like. The network apparatus 10 may then provide the updated map information/data. For example, the network apparatus 10 may provide the updated map information/data such that one or more vehicle apparatuses 20 receive the updated map information/data via one or more networks 50. In an example embodiment, the network apparatus 10 provides the updated map information/data corresponding to an intersection such that the traffic signal apparatus 30 corresponding to the intersection receives the updated map information/data. The traffic signal apparatus 30 may then provide the updated map information/data to vehicle apparatuses 20 within DSRC range of the traffic signal apparatus 30 via DSRC messages. Given the very low latency of DSRC message delivery, providing updated map information/data to vehicle apparatuses 20 through DSRC messages may be particularly useful for safety related scenarios.

In various embodiments, the map information/data corresponding to an intersection may be defined in multiple map layers of a digital map and/or geographic database. In an example embodiment, a map layer may correspond to a tile of a digital map. For example, the digital map may be divided into tiles (e.g., that provide a tiling of a geographic region) such that the digital map may be updated and/or communicated (e.g., transmitted) in reasonably-sized portions. In an example embodiment, a layer may correspond to a defined area about the intersection and/or traffic signal 39. For example, a layer may correspond to the area within a predefined radius (e.g., one mile, half a mile, quarter of a mile, one kilometer, half a kilometer, and/or the like) of the intersection and/or traffic signal 39. In various embodiments, an intersection may be uniquely identified within a geographic database and/or digital map by an intersection identifier. In an example embodiment, one or more layers of the multiple map layers may be indexed by the intersection identifier. Various other elements of the map information/data corresponding to the intersection may also be indexed by the intersection identifier (e.g., the connection information/data, maneuver information/data, and/or the like).

In an example embodiment, the multiple map layers of the map information/data comprises a layer encoding information regarding stop lines. For example, the information regarding stoplines may comprise geometry information/data indicating the position of a stop line for each ingress lane of the intersection. In an example embodiment, the stop line may comprise a geometry information/data that includes the position of a stop line for each lane having a stop line present on the pavement at the intersection and a stop line for a particular lane may be "turned off" or "turned on" depending on whether the corresponding lane is currently an ingress lane or an egress lane. For example, the layer encoding information regarding stop lines may comprise information/data indicating the location of a stop line for lane 302C and lane 302G. However, the stop line of the map information/data corresponding to time T1 may have the stop line for lane 302C "turned off" and the stop line for lane 302G "turned on" whereas the stop line of the map information/data corresponding to time T2 may have the stop line for lane 302C "turned on" and the stop line for lane 302G "turned off." For example, a stop line for a particular lane may be "turned off" or "turned on" by flagging the information/data defining the stop line of the particular lane as not currently in use and/or via some other marker associated with information/data defining the stop line and/or metadata corresponding to the information/data defining the stop line.

In an example embodiment, the multiple map layers comprise a detailed approach geometry layer. In an example embodiment, the detailed approach geometry layer provides geometry information/data that describes the geometry of lanes in the vicinity of the intersection. For example, the detailed approach geometry layer may include information/data regarding the curvature of a lane as it approaches the intersection, the grade (e.g., incline, decline, flat, and extent thereof) of a lane as it approaches the intersection, and/or other lane geometry information/data. For example, the detailed approach geometry layer may describe the trajectory of a center line, right border, and/or left border of the lane as the lane approaches the intersection. In an example embodiment, the detailed approach geometry layer only comprises geometry information/data for ingress lanes of the intersection. In an example embodiment, the detailed approach layer comprises geometry information/data for both ingress and egress lanes of the intersection (or at least one egress lane). In an example embodiment, the geometry information/data may be accurate and/or precise enough to support automated operation of a vehicle 5.

In an example embodiment, the multiple map layers comprise a simplified intersection description layer. In an example embodiment, the simplified intersection description layer provides a simplified description of the geometry of the intersection. In an example embodiment, the simplified intersection description layer is generated by processing the detailed geometry layer to provide an efficient (e.g., least number of bytes) description of the topology of the intersection. In an example embodiment, the simplified intersection description layer is generated by processing the detailed geometry layer to provide an efficient (e.g., least number of bytes) description of the topology of the intersection while meeting predefined criteria. In an example embodiment, the simplified description layer is indexed by the corresponding intersection identifier. In various embodiments, the simplified intersection description layer may be updated responsive to an intersection being affected by an event such that the simplified intersection description layer describes the current (e.g., (near) real-time) state of the intersection.

In an example embodiment, the multiple map layers comprises a meta data layer. In an example embodiment, the meta data layer comprises information/data that helps to optimize the efficiency of the simplified description layer. For example, the meta data layer may comprise information/data such as the distance to adjacent intersections or sight line of visibility to the intersection along one or more ingress lanes of the intersection (e.g., does an ingress lane curve while approaching the intersection such that the intersection is not visible until the vehicle is immediately approaching the intersection). In an example embodiment, the information/data of the meta data layer may be used in determining and/or defining the predefined criteria corresponding to the simplified description layer and/or to determine if the simplified description layer meets the predefined criteria.

Generating and Providing Dynamic Intersection Information/Data

FIG. 5 provides a flowchart illustrating various procedures, operations, processes, and/or the like for generating and providing dynamic intersection information/data. Starting at block 502, traffic information/data corresponding to an intersection is received. For example, the network apparatus 10 may receive traffic information/data corresponding to the intersection. For example, the network apparatus 10 may comprise means, such as processor 12, memory 14, communications interface 16, and/or the like for receiving traffic information/data corresponding to the intersection. In various embodiments, the intersection is identified via a unique intersection identifier. In various embodiments, a traffic signal 39 is located at the intersection and is configured to control the flow of traffic through the intersection. In an example embodiment, the traffic signal 39 and/or the corresponding traffic signal apparatus 30 is identified by a signal identifier linked to the intersection identifier identifying the intersection. In an example embodiment, the intersection identifier is the signal identifier. In various embodiments, the traffic information/data may comprise one or more of raw probe information/data (e.g., probe trajectories), map-matched and/or lane-matched vehicle trajectories, lane level traffic information/data and/or road segment level traffic information/data corresponding to traffic flow, information/data received from a traffic management entity and/or department of transportation (e.g., regarding scheduled road/lane closures, construction, first responder incident information/data, expected at-grade train crossings and/or activation of an at-grade train crossing alert/gate, and/or the like), historical traffic information/data (e.g., historical information/data regarding the flow of traffic through the intersection), and/or the like.

At block 504, the traffic information/data is analyzed to determine lane connection information/data, maneuver information/data, lane flow information/data and/or the like for the intersection. In an example embodiment, the lane connection information/data comprises information/data identifying ingress lanes and corresponding egress lanes of the intersection. In various embodiments, maneuver information/data indicates the maneuvers that are available and/or allowed during the various signal phases of the traffic signal 39. For example, the maneuver information/data may indicate how and/or if a vehicle approaching the intersection in a particular ingress lane may traverse the intersection to one or more egress lanes during a particular signal phase of the traffic signal 39. In an example embodiment, the lane flow information/data comprises information/data regarding the volume of traffic, representative speed and/or range of speeds of traffic, and/or the like of one or more ingress and/or egress lanes of the intersection. In various embodiments, the connection, maneuver, and/or lane flow information/data may be time dependent and/or binned by time of day, time/day of the week, and/or the like. For example, the network apparatus 10 may analyze the traffic information/data corresponding to the intersection and determine connection, maneuver, lane flow, and/or other map information/data for the intersection based on the traffic information/data. For example, the network apparatus 10 may comprise means, such as processor 12, memory 14, and/or the like, for analyzing the traffic information/data corresponding to the intersection and determining connection, maneuver, lane flow, and/or other map information/data for the intersection based on the traffic information/data. For example, the network apparatus 10 may analyze probe trajectories (e.g., timestamped probe trajectories) that pass through the intersection to determine ingress lanes and corresponding egress lanes, allowed and/or available maneuvers through the intersection, groups of allowed and/or available maneuvers that are concurrently available (e.g., during the same signal phase), traffic volume, traffic speed, and/or the like through the intersection.

At block 506, the map information/data for the intersection is generated based on the determined connection, maneuver, and/or lane flow information/data for the intersection. For example, the network apparatus 10 may generate map information/data for the intersection based on the determined connection, maneuver, and/or lane flow information/data for the intersection. For example, the network apparatus 10 may comprise means, such as processor 12, memory 14, and/or the like, for generating map information/data for the intersection based on the determined connection, maneuver, and/or lane flow information/data for the intersection. In various embodiments, information/data from a geographic database (e.g., link, intersection, and/or point of interest (POI) records) may be used in the generation of the map information/data corresponding to the intersection. In various embodiments, the map information/data and/or various aspects thereof may be associated with and/or indexed by the intersection identifier. For example, metadata corresponding to the map information/data and/or various aspects thereof may comprise the intersection identifier. For example, multiple map layers corresponding to the intersection may be defined as described above. For example, the determined connection, maneuver, and/or lane flow information/data for the intersection may be aggregated, normalized, and/or the like into a predetermined format; matched to various signal phases of the traffic signal 39 based on SPaT information/data for the traffic signal 39; and/or the like. For example, it may be determined that a first group of allowed and/or available maneuvers that are concurrently available correspond to a first phase of the traffic signal 39 and a second group of allowed and/or available maneuvers that are concurrently available correspond to a second phase of the traffic signal 39.

At block 508, the SPaT information/data for the intersection and/or traffic signal 39 may be requested and/or received. For example, the network apparatus 10 may request and/or receive SPaT information/data for the intersection and/or traffic signal 39. For example, the network apparatus 10 may comprise means, such as the processor 12, memory, communications interface 16, and/or the like, for requesting and/or receiving the SPaT information/data for the intersection and/or traffic signal 39. For example, The SPaT information/data may be requested and/or received from the traffic management apparatus 40 and/or the traffic signal apparatus 30 (e.g., via network 50). For example, the SPaT information/data may describe the current and future signal phases of the traffic signal 39.

At block 510, the map information/data and/or SPaT information/data for the intersection may be provided. For example, the network apparatus 10 may provide the map information/data and/or SPaT information/data. For example, the network apparatus 10 may comprise means, such as processor 10, memory 12, communications processor 16, and/or the like, for providing the map information/data for the intersection. For example, the map information/data and/or SPaT information/data may be provided such that one or more vehicle apparatuses 20 receive the map information/data and/or SPaT information/data. In an example embodiment, the map information/data and/or SPaT information/data are incorporated into a tile and/or portion of a digital map (e.g., a tile and/or portion corresponding to and/or comprising the location of the intersection). In an example embodiment, the map information/data and/or SPaT information/data is provided via a Cloud-based service such as the Here Open Location Platform (OLP). For example, the map information/data and/or SPaT information/data may be received by one or more vehicle apparatuses 20 via network 50. For example the map information/data may be provided to vehicle apparatuses 20 that are in the vicinity of the intersection (e.g., located within a predefined radius of the intersection and/or traffic signal 39), vehicle apparatuses 20 located within the geographic area corresponding to the tile comprising the map information/data and/or SPaT information/data corresponding to the intersection, vehicle apparatuses 20 expected to travel through the intersection (e.g., based on a route being traversed by the corresponding vehicle 5), and/or the like. In another example, a traffic signal apparatus 30 may receive the map information/data and/or SPaT information/data and provide the map information/data and/or SPaT information/data to one or more vehicle apparatuses 20 in the vicinity of the traffic signal apparatus 30 via, for example, DSRC messages.

In various embodiments, a vehicle apparatus 20 may use the map information/data and/or SPaT information/data corresponding to the intersection to perform one or more navigation functions. For example, the vehicle apparatus 20 may use the map information/data and/or SPaT information/data corresponding to the intersection to perform route determination, lane level route determination, operating the corresponding vehicle 5 along a lane level route, route travel time determination, lane maintenance, route guidance, lane level route guidance, provision of traffic information/data, provision of lane level traffic information/data, and/or the like.

Generating and Providing Updated Intersection Information/Data

FIG. 6 provides a flowchart illustrating various procedures, operations, processes, and/or the like for generating and providing updated dynamic intersection information/data. Starting at block 602, current traffic information/data is received. In various scenarios, the traffic information/data may indicate an event has occurred. For example, the network apparatus 10 may receive current traffic information/data. For example, the network apparatus 10 may comprise means, such as processor 12, memory 14, communications interface 16, and/or the like for receiving current traffic information/data. In an example embodiment, the received traffic information/data is traffic information/data to be analyzed to determine if any events are indicated by the traffic information/data. In an example embodiment, the traffic information/data is provided by another computing apparatus that has determined that the traffic information indicates an event has occurred. In various embodiments, the current traffic information/data may be received in (near) real time with respect to the generation of the traffic information/data and/or within five, ten, or fifteen minutes of the generation of the traffic information/data, received at a time corresponding to the traffic information/data (e.g., the traffic information/data may correspond to a scheduled event and the traffic information/data may be received by the processor for analysis at about the time the scheduled event is scheduled to occur), and/or the like. For example, the current traffic information/data corresponds to the traffic conditions currently being experienced at a location corresponding to the current traffic information/data.

In an example embodiment, traffic information/data comprises one or more of raw probe information/data (e.g., probe trajectories), map-matched and/or lane-matched vehicle trajectories, lane level traffic information/data and/or road segment level traffic information/data corresponding to traffic flow, information/data received from, but not limited to, a traffic management entity and/or department of transportation (e.g., regarding scheduled road/lane closures, construction, first responder incident information/data, expected at-grade train crossings and/or activation of an at-grade train crossing alert/gate, and/or the like), historical traffic information/data, and/or the like. In an example embodiment, the information received from a traffic management entity and/or department of transportation is provided via a traffic management apparatus 40. In an example embodiment, the traffic information/data has already been processed by another computing apparatus (e.g., a traffic management apparatus 40 and/or the like) to determine that the traffic information/data does indicate the occurrence of an event prior to the network apparatus 10 receiving the traffic information/data.

At block 604, the current traffic information/data is analyzed to identify events. For example, the network apparatus 10 may analyze the current traffic information/data to identify events. For example, the network apparatus 10 may comprise means, such as processor 12, memory 14, and/or the like, for analyzing the current traffic information/data to identify events. For example, an identified event may be a scheduled event as indicated by the current traffic information/data. For example, an event may be identified based on the current volume of traffic along a particular lane and/or road segment being significantly less than the historical traffic volume along the same lane and/or road segment; the current speed of traffic along a particular lane and/or road segment being significantly less than the historical traffic speed along the same lane and/or road segment; and/or the like. In an example embodiment, an event is identified based on the dispatch of first responder (e.g., ambulance, police, fire truck) to a particular location. In an example embodiment, an event is identified based on information indicating that one or more signals indicating the state of a reversible lane have switched, that an at-grade train crossing alert/gate has been activated, and/or the like. In an example embodiment, the network apparatus 10 receives event information/data corresponding to an identified event from another computing entity (e.g., traffic management apparatus 40 and/or other computing entity in communication with the network apparatus 10). In various embodiments, the event information/data is traffic information/data indicative of and/or that characterizes the identified event.

At block 606, it determined if the identified event affects an intersection. For example, the network apparatus 10 may determine if the identified event affects an intersection. For example, the network apparatus 10 may comprise means, such as processor 12, memory 14, and/or the like, for determining if the identified event affects an intersection. In various embodiments, an event affects an intersection if the event affects one or more ingress and/or egress lanes of an intersection. In an example embodiment, the event affects one or more ingress and/or egress lanes of an intersection if the event prevents a normal flow of traffic in the corresponding ingress and/or egress lanes. In general, the normal flow of traffic is the flow of traffic observed from historical traffic information/data for a time period that corresponds to the current time period (e.g., time of day, time/day of the week, and/or the like). In an example embodiment, the event affects one or more ingress and/or egress lanes of the intersection if the event causes the flow of traffic along the one or more ingress and/or egress lanes to change as compared to a time period immediately before the occurrence of the event (e.g., the ten minutes, fifteen minutes, half an hour, and/or the like immediately preceding the occurrence of the event). For example, the event may affect the one or more ingress and/or egress lanes of the intersection if the event prevents vehicles from traversing and/or traveling along the one or more ingress and/or egress lanes of the intersection. In various embodiments, the event may be an accident or incident (e.g., blocking and/or partially blocking one or more ingress and/or egress lanes of an intersection), construction, a planned road/lane closure (e.g., for a festival, parade, road race, or the like), switching of a reversible lane, an evacuation route being activated, a train traversing an at-grade crossing, and/or the like. In an example embodiment, it may be determined that an event affects an intersection if the event is located within a predetermined radius of the intersection (e.g., within 100 feet, 200 feet, 500 feet, a tenth of a mile, a quarter of a mile, a tenth of a kilometer, a quarter of a kilometer, half a kilometer, and/or the like of the intersection and/or the traffic signal 39).

If it is determined that the event does not affect any intersections, at block 606, the process returns to block 602 and/or 604 to receive and/or further analyze current traffic information/data.

If it is determined that the event affects an intersection, at block 606, the affected intersection(s) are identified. For example, the geolocation of an event (e.g., latitude and longitude) and the geolocation of one or more intersections may be used to identify one or more intersections affected by the event. In another example, the event may be map-matched to a road segment and/or one or more lanes affected by the event. The road segment and/or one or more lanes may then be used to identify one or more affected intersections for which the affected road segment and/or one or more affected lanes are associated. For example, the intersection(s) for which the one or more affected lanes are ingress and/or egress lanes may be determined to be affected by the event. Responsive to identifying the affected intersection(s) (e.g., identifying the intersection identifier for an affected intersection), the process continues to block 608.

At block 608, the map information/data for the affected intersection is updated. For example, the network apparatus 10 may update the map information/data for the affected intersection. For example, the network apparatus 10 may comprise means, such as the processor 12, memory 14, and/or the like, for updating the map information/data for the affected intersection. For example, updated connection information/data and/or updated maneuver information/data may be determined and/or generated for any lanes of the intersection affected by the event. In various embodiments, updated connection information/data and/or updated maneuver information/data is also determined and/or generated for lanes (previously) connected to the affected lanes. For example, referring to the example intersection 404 shown in FIG. 4, when lane 402K was closed due to the event 406, updated connection and/or maneuver information/data for lane 402K was generated and/or determined. Updated connection and/or maneuver information/data for lanes 402E and 402S were also generated and/or determined due to the event 406 as lanes 402E and 402S were connected and/or linked to lane 402K in the map information/data for the intersection corresponding to the time period immediately prior to the occurrence of the event 406. For example, map information/data corresponding to the connection, maneuvers, and/or the like corresponding to the affected ingress and/or egress lanes may be updated and map information/data corresponding to connection, maneuvers, and/or the like corresponding to ingress and/or egress lanes that are and/or were previously connected to the affected ingress and/or egress lanes may be updated. Various other updated map information/data may be generated and/or determined (e.g., in addition to the connection and/or maneuver information/data). For example, in an example embodiment, the stop line layer of the map information/data may be updated, the simplified description layer may be updated, lane attributes corresponding to one or more lanes of the intersection may be updated, and/or the like. In various embodiments, the updated map information/data is configured to reflect the current (e.g., (near) real-time) status of the intersection including connections between lanes, available and/or allowed maneuvers for various signal phases of the traffic signal 39, and/or the like.

Continuing with FIG. 6, at block 610, modified SPaT information/data for the traffic signal 39 configured to control the flow of traffic through the intersection may be generated and/or received. For example, in an example embodiment, the network apparatus 10 may generate modified SPaT information/data for controlling the flow of traffic through the intersection in an efficient manner while the event is affecting one or more ingress and/or egress lanes of the intersection. For example, as noted above, when lanes 402J and 402K are affected by the event 406, an efficient flow of traffic through the intersection 404 is to skip signal phase 1 and only use signal phases 2, 3, 4, and 5. In an example embodiment, the traffic management apparatus 40 and/or traffic signal apparatus 30 may determine modified SPaT information/data and cause the traffic signal 39 to be operated in accordance with the modified SPaT information/data. In an example embodiment, the network apparatus 10 may request and/or receive (e.g., from the traffic management apparatus 40 and/or traffic signal apparatus 30) the SPaT information/data being used by the traffic signal apparatus 30 to control the traffic signal 39. For example, the network apparatus may comprise means, such as processor 12, memory 14, communications interface 16, and/or the like, for generating modified SPaT information/data and/or requesting and/or receiving current SPaT information/data for the traffic signal 39.

At block 612, the updated map information/data and/or modified/current SPaT information/data is provided. For example, if the network apparatus 10 generated modified SPaT information/data, the network apparatus 10 may provide the modified SPaT information/data such that the traffic signal apparatus 30 receives the modified SPaT information/data. For example, the network apparatus 10 may provide the updated map information/data and/or modified/current SPaT information/data. For example, the network apparatus 10 may comprise means, such as processor 10, memory 12, communications processor 16, and/or the like, for providing the updated map information/data and/or the modified/current SPaT information/data for the intersection. For example, the updated map information/data and/or modified/current SPaT information/data may be provided such that one or more vehicle apparatuses 20 receive the updated map information/data and/or modified/current SPaT information/data. In an example embodiment, the updated map information/data and/or modified/current SPaT information/data are incorporated into a tile and/or portion of a digital map (e.g., a tile and/or portion corresponding to and/or comprising the location of the intersection). In an example embodiment, the updated map information/data and/or modified/current SPaT information/data is provided via a Cloud-based service such as the Here Open Location Platform (OLP). For example, the updated map information/data and/or modified/current SPaT information/data may be received by one or more vehicle apparatuses 20 via network 50. For example the updated map information/data may be provided to vehicle apparatuses 20 that are in the vicinity of the intersection (e.g., located within a predefined radius of the intersection and/or traffic signal 39), vehicle apparatuses 20 located within the geographic area corresponding to the tile comprising the updated map information/data and/or modified/current SPaT information/data corresponding to the intersection, vehicle apparatuses 20 expected to travel through the intersection (e.g., based on a route being traversed by the corresponding vehicle 5), and/or the like. In another example, a traffic signal apparatus 30 may receive the updated map information/data and/or modified/current SPaT information/data and provide the updated map information/data and/or modified/current SPaT information/data to one or more vehicle apparatuses 20 in the vicinity of the traffic signal apparatus 30 via, for example, DSRC messages.

In various embodiments, a vehicle apparatus 20 may use the updated map information/data and/or modified/current SPaT information/data corresponding to the intersection to perform one or more navigation functions. For example, the vehicle apparatus 20 may use the updated map information/data and/or modified/current SPaT information/data corresponding to the intersection to perform route determination, lane level route determination, operating the corresponding vehicle 5 along a lane level route, route travel time determination, lane maintenance, route guidance, lane level route guidance, provision of traffic information/data, provision of lane level traffic information/data, vehicle trajectory determination and/or guidance, vehicle speed and/or handling control, and/or the like.

In various embodiments, after some time and/or a predetermined time (if the event is a scheduled event) the event no longer affects the intersection. In various embodiments, the traffic information/data may be analyzed to determine when an event is resolved and no longer affects the intersection. For example, the volume of traffic along an affected lane may be monitored and when the volume of traffic along the affected lane increases (as indicated by the traffic information/data), it may be determined that the lane is no longer affected and the event has been resolved. In an example embodiment, when it is determined that an event is resolved, the map information/data (e.g., the map information/data determined and/or generated at block 506) is once again provided. In an example embodiment, when it is determined that an event is resolved and/or that the status of an affected lane has changed, further updated and/or new map information/data is determined and/or generated. For example, the resolution of an event may be interpreted as an event itself and the updated map information/data may be updated to reflect the current status, connection, available and/or allowed maneuvers, and/or the like corresponding to the intersection. Thus, map information/data and/or intersection data (e.g., map information/data and SPaT information/data) that reflects the current (e.g., (near) real-time accurate) status of the intersection may be provided to one or more vehicles for use in performing one or more navigation functions.

Technical Advantages

Various embodiments of the present invention provide methods, apparatuses, systems, computer program products, and/or the like for providing dynamic intersection information/data. In various embodiments, dynamic intersection information/data corresponding to an intersection comprises dynamic map information/data describing the topology of the intersection and the ingress and/or egress lanes of the intersection. In various embodiments, the dynamic map information/data describes the topology of the intersection with (near) real-time accuracy. In various embodiments, the dynamic intersection information/data corresponding to an intersection comprises current SPaT information/data for a traffic signal controlling the flow of traffic through the intersection. The dynamic intersection information/data is provided to vehicle apparatuses for use in performing various navigation functions. Thus, various embodiments provide human vehicle operators and ADAS and/or automated self-driving systems with current information/data regarding the maneuvers through an intersection allowed and/or available during various signal phases of the traffic signal controlling the flow of traffic through the intersection. Thus, various embodiments of the present invention provide an improvement to the functioning of the vehicle apparatus. In particular, various embodiments provide improvements to navigational technology by improving the performing of navigation functions by the vehicle apparatus. Additionally, various embodiments provide improvements to the technical fields of ADAS and/or automated self-driving vehicles by reducing the risk that ADAS and/or automated self-driving vehicles become stuck in traffic or create a dangerous situation (e.g., traveling the wrong way on a reversible lane) due to the use of out of date intersection information/data. Various other technical advantages provided by various embodiments comprise improved efficiency of operations around traffic management, traffic light control optimization, improved safety around intersections for all participants in traffic, improved dynamic routing and navigation services in urban areas, reduced travel time, better fuel economy resulting from optimization of unnecessary vehicle acceleration, deceleration, engine idle time while waiting on red lights, and so on.

III. Example Apparatus

The network apparatus 10, vehicle apparatus 20, traffic signal apparatus 30, and/or traffic management apparatus 40 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the network apparatus 10, vehicle apparatus 20, traffic signal apparatus 30, and/or traffic management apparatus 40 may be embodied in other types of computing devices, such as a server, a personal computer, a computer workstation, a laptop computer, a plurality of networked computing devices or the like. In an example embodiment, a vehicle apparatus 20 is an in-vehicle navigation system, mobile navigation device, and/or vehicle control system onboard a vehicle 5; a traffic signal apparatus 30 is a controller of a traffic signal 39; a network apparatus 10 is a server; and a traffic management apparatus 40 is a server. In this regard, FIG. 2A depicts an example network apparatus 10, FIG. 2B depicts an example vehicle apparatus 20, and FIG. 2C depicts an example traffic signal apparatus 30 that may be embodied by various computing devices including those identified above.

As shown, the network apparatus 10 of an example embodiment may include, may be associated with, or may otherwise be in communication with a processor 12 and a memory device 14 and optionally a communication interface 16 and/or a user interface 18. Similarly, the vehicle apparatus 20 may comprise a processor 22, memory 24, a communications interface 26, a user interface 28, one or more sensors 29 such as one or more location sensors (e.g., a GNSS sensor; IMU sensors; an odometry system; and/or the like) and/or other components configured to perform various operations, procedures, functions or the like described herein. For example, in an example embodiment, a vehicle apparatus 20 may comprise and/or be in communication with one or more sensors such as, for example, a camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 20 to determine one or more features of the corresponding vehicle's 5 surroundings and/or monitor the vehicle's 5 operating parameters). In various embodiments, the traffic signal apparatus 30 of an example embodiment may include, may be associated with, or may otherwise be in communication with a processor 32, a memory device 34, a communication interface 36, and/or a user interface 38. For example, the user interface 38 of the traffic signal apparatus 30 may be one or more visual and/or audible indicia of the traffic signal 39. Similarly, in an example embodiment, a traffic management apparatus 40 may include, be associated with, or may otherwise be in communication with a processor, a memory device, a communication interface, and/or a user interface.

In some embodiments, the processor 12, 22, 32 (and/or co-processors or any other processing circuitry assisting or otherwise associated with the processor) may be in communication with the memory device 14, 24, 34 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10, vehicle apparatus 20, traffic signal apparatus 30, and/or traffic management apparatus 40 may be embodied by a computing device and/or computing entity. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32 may be embodied in a number of different ways. For example, the processor 12, 22, 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22, 32 may include one or more processing cores configured to perform independently. A multi-core processor may enable multiprocessing within a single physical package. Additionally or alternatively, the processor 12, 22, 32 may include one or more processors configured in tandem via the bus to enable independent execution of instructions, pipelining and/or multithreading.

In an example embodiment, the processor 12, 22, 32 may be configured to execute instructions stored in the memory device 14, 24, 34 or otherwise accessible to the processor. Alternatively or additionally, the processor 12, 22, 32 may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10, vehicle apparatus 20, traffic signal apparatus 30, and/or traffic management apparatus 40 may include a user interface 18, 28, 38 that may, in turn, be in communication with the processor 12, 22, 32 to provide output to the user, such as one or more instances of (updated) map information/data and/or graphical presentations thereof, one or more routes through a road network (e.g., lane-level routes), and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 32 (e.g., memory device 14, 24, 34 and/or the like).

The network apparatus 10, vehicle apparatus 20, traffic signal apparatus 30, and/or traffic management apparatus 40 may further include a communication interface 16, 26, 36. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10, vehicle apparatus 20, traffic signal apparatus 30, and/or traffic management apparatus 40 of an example embodiment, a navigation system may also include or have access to a geographic database that includes a variety of data (e.g., map information/data) utilized in constructing a route or navigation path (e.g., a lane-level route), determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment or link data records, point of interest (POI) data records, localization feature data records, and other data records. More, fewer, or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, travel lane data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to links, lanes of a road segments, nodes, intersection, POIs, and/or the like and/or the corresponding data records, a localization layer (e.g., comprising localization features) and/or the corresponding data records, and/or the like. In an example embodiment, the network apparatus 10 may be configured to access location-based and/or time-dependent obstacle information/data from an OLP environment.

In an example embodiment, the road segment data records are links or segments, e.g., maneuvers of a maneuver graph, representing roads, streets, travel lanes of roads and/or streets, or paths, as can be used in the calculated route or recorded route information for determination of one or more personalized routes (e.g., lane-level routes). The intersection data records are end points corresponding to the respective links or segments of the road segment data records. The road link data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The road/link segments, travel lanes, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include information/data about the POIs and their respective locations in the POI data records. The geographic database can also include data about places, such as cities, towns, or other communities, and other geographic features, such as bodies of water, mountain ranges, etc. Such place or feature data can be part of the POI information/data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records, or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be generated and/or updated based on map information/data generated and/or extracted from sensor information/data provided by vehicle apparatuses 20 through the use of update and/or notification messages. In various embodiments, the vehicle apparatuses 20 may be onboard vehicles owned and/or operated by and/or on behalf of members of the general public or onboard vehicles owned and/or operated as part of a private fleet.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10 and/or vehicle apparatus 20 in accordance with an example embodiment may determine the time to traverse a route that includes one or more turns at respective intersections more accurately.

IV. Apparatus, Methods, and Computer Program Products

As described above, FIGS. 5 and 6 illustrate flowcharts of a network apparatus 10, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34 of an apparatus employing an embodiment of the present invention and executed by the processor 12, 22, 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, simplifications, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    receiving and processing traffic data indicative of an event;
    determining that the event affects at least one ingress or egress lane of an intersection;

responsive to determining that the event affects at least one ingress or egress lane of the intersection, generating updated map data for the intersection by (i) updating map data corresponding to the at least one ingress or egress lane and, (ii) based on connection information corresponding to the at least one ingress or egress lane, updating map data corresponding to one or more other lanes of the intersection, wherein the updated map data is generated such that the updated map data indicates at least one maneuver that is available through the intersection while the event affects the at least one ingress or egress lane of the intersection, wherein the at least one maneuver that is available through the intersection while the event affects the at least one ingress or egress lane of the intersection is indicated by maneuver information identifying a first ingress lane of the intersection and a first egress lane of the intersection connected to the first ingress lane by the at least one maneuver through the intersection, neither the first ingress lane nor the first egress lane being the at least one ingress or egress lane affected by the event; and providing the updated map data such that at least one vehicle apparatus receives the updated map data, wherein the at least one vehicle apparatus uses the updated map to perform one or more navigation functions.

2. The method of claim 1, wherein the map data comprises connection data linking the at least one ingress or egress lane of the intersection to one or more egress or ingress lanes of the intersection.

3. The method of claim 1, wherein the map data comprises maneuver data indicating how a vehicle may move through the intersection on a trajectory that comprises the at least one ingress or egress lane and a signal phase of a traffic signal at the intersection corresponding to the trajectory.

4. The method of claim 1, further comprising:
receiving signal phase and timing (SPaT) data for a traffic signal located at the intersection; and
providing the SPaT data to the vehicle apparatus along with the updated map data, the SPaT data being configured for use by the vehicle apparatus in performing one or more navigation functions.

5. The method of claim 1, further comprising:
determining modified signal phase and timing (SPaT) data for a traffic signal located at the intersection based on the updated map data; and
providing the modified SPaT data such that a traffic signal apparatus receives the modified SPaT data, wherein the traffic signal apparatus is configured to operate a traffic signal located at the intersection in accordance with the modified SPaT data.

6. The method of claim 5, further comprising providing the modified SPaT data to the vehicle apparatus.

7. The method of claim 1, wherein the event affects an ingress or egress lane of the intersection if the event causes a change in a flow of traffic along the ingress or egress lane.

8. The method of claim 1, wherein the event affects an ingress or egress lane of the intersection if the event prevents a flow of traffic along the ingress or egress lane.

9. An apparatus comprising at least one processor, at least one non-transitory memory storing computer program code, and at least one communications interface configured to communicate via at least one network, the computer program code configured to, when executed by the at least one processor, cause the apparatus to at least:

receive and process traffic data indicative of an event;
determine that the event affects at least one ingress or egress lane of an intersection;
responsive to determining that the event affects at least one ingress or egress lane of the intersection, generate updated map data for the intersection by (i) updating map data corresponding to the at least one ingress or egress lane and, (ii) based on connection information corresponding to the at least one ingress or egress lane, updating map data corresponding to one or more other lanes of the intersection, wherein the updated map data is generated such that the updated map data indicates at least one maneuver that is available through the intersection while the event affects the at least one ingress or egress lane of the intersection, wherein the at least one maneuver that is available through the intersection while the event affects the at least one ingress or egress lane of the intersection is indicated by maneuver information identifying a first ingress lane of the intersection and a first egress lane of the intersection connected to the first ingress lane by the at least one maneuver through the intersection, neither the first ingress lane nor the first egress lane being the at least one ingress or egress lane affected by the event; and
provide the updated map data such that at least one vehicle apparatus receives the updated map data, wherein the at least one vehicle apparatus uses the updated map to perform one or more navigation functions.

10. The apparatus of claim 9, wherein the map data comprises connection data linking the at least one ingress or egress lane of the intersection to one or more egress or ingress lanes of the intersection.

11. The apparatus of claim 9, wherein the map data comprises maneuver data indicating how a vehicle may move through the intersection on a trajectory that comprises the at least one ingress or egress lane and a signal phase of a traffic signal at the intersection corresponding to the trajectory.

12. The apparatus of claim 9, wherein the computer program code is further configured to, when executed by the at least one processor, cause the apparatus to at least:
receive signal phase and timing (SPaT) data for a traffic signal located at the intersection; and
provide the SPaT data to the vehicle apparatus along with the updated map data, the SPaT data being configured for use by the vehicle apparatus in performing one or more navigation functions.

13. The apparatus of claim 9, wherein the computer program code is further configured to, when executed by the at least one processor, cause the apparatus to at least:
determine modified signal phase and timing (SPaT) data for a traffic signal located at the intersection based on the updated map data; and
provide the modified SPaT data such that a traffic signal apparatus receives the modified SPaT data, wherein the traffic signal apparatus is configured to operate a traffic signal located at the intersection in accordance with the modified SPaT data.

14. The apparatus of claim 13, wherein the computer program code is further configured to, when executed by the at least one processor, cause the apparatus to at least provide the modified SPaT data to the vehicle apparatus.

15. The apparatus of claim 9, wherein the event affects an ingress or egress lane of the intersection if the event causes a change in a flow of traffic along the ingress or egress lane.

16. The apparatus of claim 9, wherein the event affects an ingress or egress lane of the intersection if the event prevents a flow of traffic along the ingress or egress lane.

17. A computer program product comprising at least one non-transitory computer-readable storage medium having computer-executable program code instructions stored therein, the computer-executable program code instructions comprising program code instructions configured to, when executed by a processor of an apparatus, cause the apparatus to at least:

receive and process traffic data indicative of an event;

determine that the event affects at least one ingress or egress lane of an intersection;

responsive to determining that the event affects at least one ingress or egress lane of the intersection, generate updated map data for the intersection by (i) updating map data corresponding to the at least one ingress or egress lane and, (ii) based on connection information corresponding to the at least one ingress or egress lane, updating map data corresponding to one or more other lanes of the intersection, wherein the updated map data is generated such that the updated map data indicates at least one maneuver that is available through the intersection while the event affects the at least one ingress or egress lane of the intersection, wherein the at least one maneuver that is available through the intersection while the event affects the at least one ingress or egress lane of the intersection is indicated by maneuver information identifying a first ingress lane of the intersection and a first egress lane of the intersection connected to the first ingress lane by the at least one maneuver through the intersection, neither the first ingress lane nor the first egress lane being the at least one ingress or egress lane affected by the event; and provide the updated map data such that at least one vehicle apparatus receives the updated map data, wherein the at least one vehicle apparatus uses the updated map to perform one or more navigation functions.

18. The computer program product of claim 17, wherein the map data comprises at least one of (a) connection data linking the at least one ingress or egress lane of the intersection to one or more egress or ingress lanes of the intersection or (b) maneuver data indicating how a vehicle may move through the intersection on a trajectory that comprises the at least one ingress or egress lane and a signal phase of a traffic signal at the intersection corresponding to the trajectory.

19. The computer program product of claim 17, wherein the computer program code is further configured to, when executed by the at least one processor, cause the apparatus to at least:

receive signal phase and timing (SPaT) data for a traffic signal located at the intersection; and provide the SPaT data to the vehicle apparatus along with the updated map data, the SPaT data being configured for use by the vehicle apparatus in performing one or more navigation functions.

20. The computer program product of claim 17, wherein the event affects an ingress or egress lane of the intersection when at least one of (a) the event causes a change in a flow of traffic along the ingress or egress lane or (b) the event affects an ingress or egress lane of the intersection if the event prevents a flow of traffic along the ingress or egress lane.

* * * * *